Nov. 26, 1968
G. REID
3,412,561
REED-TRENCH TERRACING
Filed Dec. 16, 1965
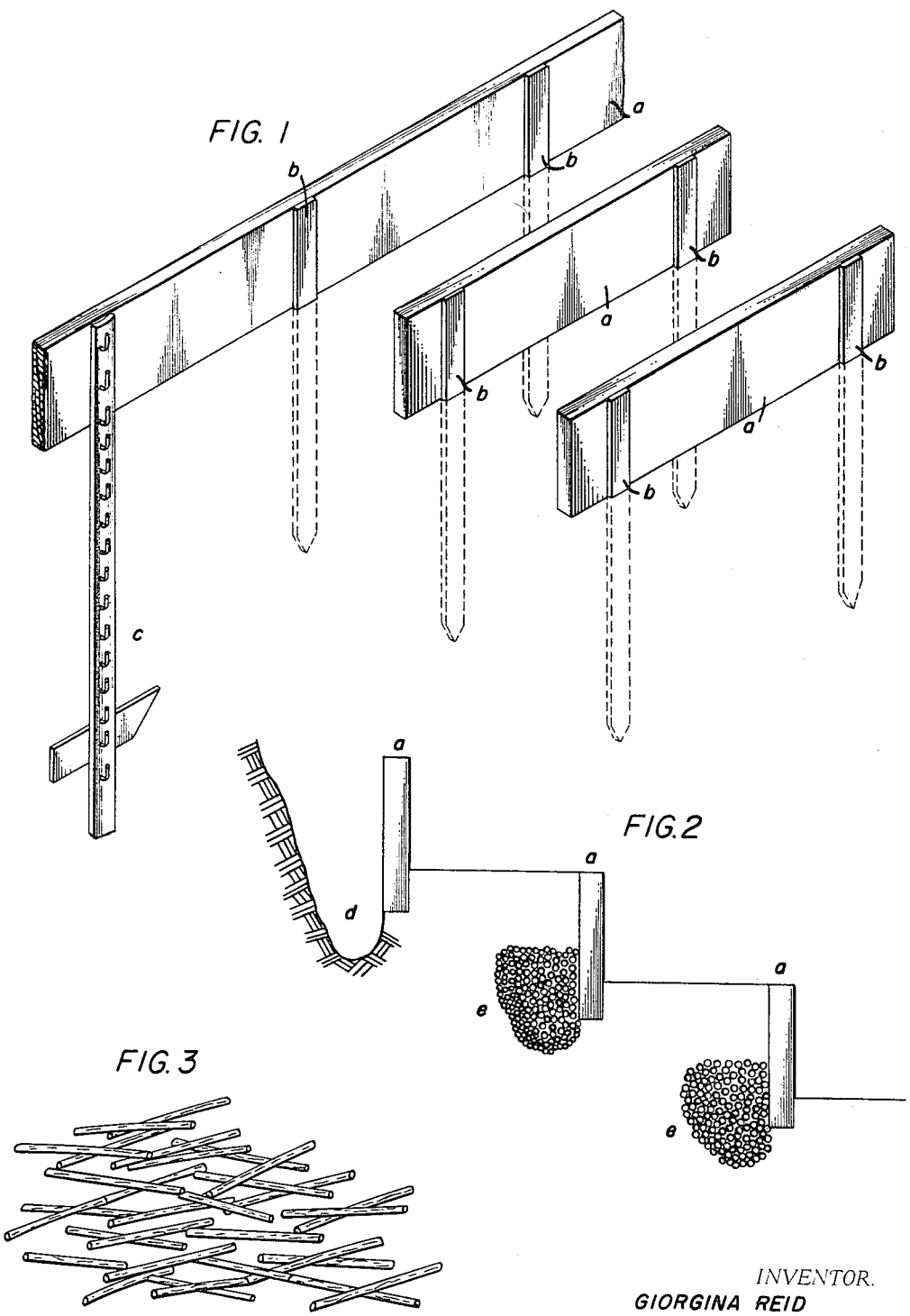
INVENTOR.
GIORGINA REID 3,412,561
REED-TRENCH TERRACING
Giorgina Reid, 37—12 85th St.,
Jackson Heights, N.Y. 11372
Filed Dec. 16, 1965, Ser. No. 514,418
2 Claims. (Cl. 61—35)

ABSTRACT OF THE DISCLOSURE

A method of preventing the erosion of a sloping land surface is disclosed wherein the elongated planks are secured to the surface transversely of the slope, trenches are formed adjacent the planks on the upward side thereof controlling shorefront bluff erosion by establishing sand-binding vegetation quickly, with a minimum of expense and effort.

---

This invention relates to a mechanical-organic method of controlling shorefront bluff erosion by establishing sand-binding vegetation quickly, with a minimum of expense and effort.

It is particularly effective in stilling the sand, clay, gravel, and boulders on steep bluffs where desert conditions exist due to the forces of wind and water on the face of the slope, and wave action at the foot of it.

Controlling erosion on all soils involves the establishment of adapted grasses, shrubs, trees. On level or gently sloping land, where farming machinery can be used, it is only a matter of available manpower and machinery to create the conditions favorable to agriculture. On steep slopes where such machinery is unable to operate, or which would be detrimental to conservation practices, bench terracing is in order.

Reed-trench terracing falls into the category of bench terracing, as it involves a series of steps, or levels, tantamount to benches. This system of terracing differs from other types of terracing, such as the sloping stone walls used in vineyards, the mud embankments of rice paddies, fascines embedded in the soil for drainage in slipped slopes and dams, concrete facings with impervious asphalt levels for resisting attack by rising flood waters of river banks, and wave action at the shores of lakes or seashores. The difference between my method of terracing and that of others lies, as the name implies, in the use of reeds embedded at the base of each terrace to perform the special function required of them, which will be described fully in the ensuing specifications.

While the art of terracing is as old as civilization itself, no type of terracing has heretofore been devised that will control the flow of sand on steep slopes. Other methods that have been tried, such as the placement of wooden barriers at intervals along the face of the slope to act as catch-basins, have failed to contain and still the sand for a sufficient length of time to allow sand-binding vegetation to take root; they have either tipped forward and collapsed under the increasing weight imposed upon them, or, if being of sturdy enough construction to accept the weight of sand drifting down from above, have allowed it to escape through the lower portion of the barrier.

The particular placement and quantity of the masses of reeds entrenched at the base of each terrace prevents sand slippage and effectively stills the sandy soil, and other mobile materials, providing a stable seed-bed for the establishment of the essential soil-binding vegetation.

The reeds (common reed grass, or *Phragmites communis*) have structural characteristics that make them effective erosion deterrents. Their stems, being hollow and jointed somewhat like those of bamboo grass, are in effect miniature pipes with an unusual capacity for storing water. At the end of the growing season the stems wither and break at their nodal points. Carried out of the marshes and coves on the tides, the reeds eventually land on the beaches, where they show a strong disinclination to move, often despite gale-force winds. These qualities, capacity for storing water, and ability to stay put, added to their toughness, make them the perfect agents for stilling sand. They prevent the passage of sand under the barriers, collect and retain water from rainfall, spreading it laterally across the levels, preventing gullying, and reserving it to nourish the plantings above by capillary action. They also provide the necessary aeration to allow bacterial agents to perform their nitrogen-fixing function of supplying the roots with the nourishment needed for growth, which leads to the gradual accumulation of topsoil.

In short, the reeds, having provided a stable seed-bed by stilling the mobile soil, also nourish and support the plantings above, creating a flexible, breathing environment for the vegetation whose deep roots go several feet below the nurse barriers, forming a network that firmly anchors the soil, provides absorption during periods of excessive precipitation, and protection during long periods of drought.

In the drawing,

FIGURE 1 is a perspective view of the terracing;

FIGURE 2 is an end elevation of the terracing showing the reeds in place; and

FIGURE 3 shows the reed as used in the terracing.

With reference to the accompanying drawing and FIGURE 1 in particular, the latter discloses the materials and their placement in the construction of a maintenance level and steps. The letter $a$ indicates the supporting horizontal barriers, of 2 x 2″ lumber. The letter $b$ indicates the vertical supports for the horizontal barriers. I use cedar fence pickets for the purpose; cedar because it weathers well, fence pickets because they are pointed which facilitates their entry in the soil. The pickets shown in the drawing are three feet long, though longer lengths may be necessary under other circumstances. A length of three feet is the minimum allowed for effective support. The letter $c$ shows a winged steel fence post, six feet long, used to provide additional stability to maintenance levels. These posts, or stakes, should be spaced no farther than six feet apart. FIG. 2 is a cutaway section showing the succession of the terraces and the placement of the reeds at the base of each terrace. The letter $a$ is the horizontal barrier, $e$ the mass of reeds, which, when tightly compressed, should have a diameter of no less than six inches, $d$ shows the trench after removal of the soil to provide space for the insertion of the mass of reeds behind the barrier, at the juncture where wood meets the sandy soil. The letter $f$ represents the level of the soil that has been replaced after the reeds have been entrenched. The short broken lines denote the section of the pickets, posts, and boards under the soil; the longer broken lines denote the level of the soil, which is also indicated by the letter $f$. FIG. 3 gives the general appearance of the stems of the reeds as deposited on the beaches.

The desirable way to terrace a slope is by starting at the toe of the bluff. The toe should be stabilized by a substantial bulkhead. The preferred height of the retaining boards is eight inches, the maximum ten inches. The terraces may be placed farther apart where stretches of more gradual slopes are met, closer together as the steepness of the incline increases.

It must be borne in mind that the profile of the slope, after completion of terracing, must not exceed an angle of 45 degrees.

When approaching the top of the bluff, which may have a sheer drop, or which may be undercut, the area must be graded to conform to the abovementioned grade, preferably less. Failure to do this is in opposition to the laws of gravity, resulting in eventual failure of containment.

The effectiveness of reed-trench terracing lies, among other things previously mentioned, in the proper distribution of weight. Under no circumstances should the top of the bluff, as is so often recommended, be forcibly restrained by the use of heavy cribbings, railroad ties, logs, concrete revetments, or other weighty materials. These measures not only prevent the essential vegetation from taking root, but work against gravity by building up intolerable pressures, which must eventually find an outlet. Forcible restraint of the soil, which may be undergoing undue pressures under the impact of flash floods, or may contract and expand under the strain of alternate freezing and thawing, leads to collapses more formidable than those brought about by the natural processes of erosion. Therefore it is most important to plan a profile that will permit complete vegetative cover.

While the most effective protection of the bluff involves complete terracing starting at the bottom and working upward, the terraces interlocking as in a knitting operation, circumstances may not permit the work to be accomplished in one season. When a single worker is confronted wtih a large area, say a bluff of over 100 feet in height, with a frontage of one to two hundred feet, emergency measures may be in order to stabilize what is possible within the allotted time limit, with future work in view. Under such circumstances it may be necessary to space the terraces more widely across the slope, using a series of short terraces, or steps, leading from level to level. As a properly constructed reed-trench terrace is not dependent on those below it for support, it may be set in where convenient for the storage of materials that will be used either in working upward or downward, as the case demands. In making maintenance levels with connecting built-in steps it is wise to stagger the groups of steps, instead of building in a straight line, as in a ladder. This lends more stability to the slope as a whole.

The tools used for terracing are a hammer, a trowel, and a garden hose of sufficient length to reach the working area. A three-pound striking hammer has proved best for driving the pickets and stakes into the ground. The use of heavy sledge hammers should be avoided, as they increase the effort without increasing the efficiency. The trowel is used for digging the trench after the barrier is in place. The hose is used for spraying the work area to keep the sand from slipping back into the trench before the reeds have been firmly wedged into it, and to soak the reeds thoroughly in order to give the plantings to follow a good start. The fine spray of the hose should be used for stilling and shaping dry sand, as a strong jet would dislodge rather than still it. When wetting down the reeds the strong jet should be used to saturate them thoroughly. If instructions in placing the reeds are carefully adhered to, no water will seep through the bottom of the barrier, although the strong jet would deliver more water than would a long soaking rain or a flash flood.

If it is impossible to bring water to the working area, it might be advisable to work after a rain has saturated and stilled the soil temporarily. In periods of drought the soil behind the trench may be shored up by a light wooden barrier, which, after the reeds have been deposited, may be lifted out, allowing the sand to fall over the reeds.

The most convenient way to carry the reeds to the working area is to place them in burlap sacks, such as are used for potatoes. The tops can be fastened by slipping a long nail through the burlap. This will keep the contents in place should the bag tumble down the slope.

It is desirable to wear heavy-duty gardening gloves and clothing that fits closely to the body.

It will be noted that no nails, wire, or other fastening materials are used to join the horizontal and vertical supports. This facilitates driving certain sections of either into the soil as it settles, and also serves to keep the terraces independent of one another, which is a useful feature when repairs are in order.

Terraces not intended chiefly for traffic may be made of lighter-weight lumber, one-by-eight construction cedar, or cedar siding, being adequate.

On some projects, such as those encountered in boulder beaches, where transportation of materials to the working area is difficult or impossible, it may be necessary to start work from the top of the bluff, making the first level possibly ten to twenty feet below the lip, then working upward to grade the slope, and downward to deposit material removed in grading the top to a safe slope.

As may be seen from the foregoing instances, reed-trench terracing is a versatile system, permitting of many variations as need dictates.

Having set forth the above specifications, I claim:

1. A method of terracing sloping embankment for the prevention of landsliding, and to encourage the growth of vegetation thereon which comprises securing a plurality of elongated planks along the sloping land longitudinally thereof and spaced transversely to the direction of the slope, forming a trench adjacent the planks along the length of and on the upward side thereof, with the bottom of said trench extending below the lowermost edge of the planks, placing bundles of reeds into trench along the length thereof and thereafter backfilling said trench with soil.

2. The method of claim 1, wherein the reeds are wetted down in the trench prior to the step of backfilling.

References Cited

UNITED STATES PATENTS

| 3,336,758 | 8/1967 | Williams | 61—35 |
| 1,073,278 | 9/1913 | Mosher | 61—35 X |
| 1,151,608 | 8/1915 | Paech | 61—35 X |

FOREIGN PATENTS

| 761,827 | 1/1934 | France. | |

JACOB SHAPIRO, *Primary Examiner.*

UNITED STATES PATENT OFFICE
CERTIFICATE OF CORRECTION

Patent No. 3,412,561                      November 26, 1968

Giorgina Reid

It is certified that error appears in the above identified patent and that said Letters Patent are hereby corrected as shown below:

Column 2, line 34, "2 × 2" lumber" should read -- 2 × 8" lumber --.

Signed and sealed this 20th day of October 1970.

(SEAL)
Attest:

Edward M. Fletcher, Jr.                 WILLIAM E. SCHUYLER, JR.
Attesting Officer                         Commissioner of Patents